US009291522B2

(12) United States Patent
Chauveau et al.

(10) Patent No.: US 9,291,522 B2
(45) Date of Patent: Mar. 22, 2016

(54) PROCESS FOR DETERMINING POSITION PARAMETERS OF A MANUFACTURED SURFACE RELATIVE TO A REFERENCE SURFACE

(75) Inventors: Jean-Pierre Chauveau, Charenton le Pont (FR); Pascal Allione, Charenton le Pont (FR); Daniel Steigelmann, Charenton le Pont (FR)

(73) Assignee: ESSILOR INTERNATIONAL, Charenton le Pont (FR)

( * ) Notice: Subject to any disclaimer, the term of this patent is extended or adjusted under 35 U.S.C. 154(b) by 48 days.

(21) Appl. No.: 14/116,659

(22) PCT Filed: May 11, 2012

(86) PCT No.: PCT/EP2012/058806
§ 371 (c)(1), (2), (4) Date: Nov. 8, 2013

(87) PCT Pub. No.: WO2012/156322
PCT Pub. Date: Nov. 22, 2012

(65) Prior Publication Data

US 2014/0085627 A1 Mar. 27, 2014

(30) Foreign Application Priority Data

May 13, 2011 (EP) .................................... 11305581

(51) Int. Cl.

| | |
|---|---|
| ***G01B 9/00*** | (2006.01) |
| ***G01M 11/02*** | (2006.01) |
| ***B24B 13/00*** | (2006.01) |
| ***B24B 49/04*** | (2006.01) |
| ***B24B 51/00*** | (2006.01) |
| ***G06Q 50/04*** | (2012.01) |
| ***G02C 7/06*** | (2006.01) |
| ***G01B 21/00*** | (2006.01) |
| ***B29D 11/00*** | (2006.01) |

(52) U.S. Cl.
CPC ........... *G01M 11/0242* (2013.01); *B24B 13/00* (2013.01); *B24B 49/04* (2013.01);
(Continued)

(58) Field of Classification Search
CPC ......... G01M 11/02; G01B 21/00; G02C 7/02; G02C 13/00; B24B 1/00
USPC ................ 356/124, 601; 351/159.73, 159.74, 351/159.77
See application file for complete search history.

(56) References Cited

U.S. PATENT DOCUMENTS

| | | | | |
|---|---|---|---|---|
| 4,980,993 | A * | 1/1991 | Umezaki | 451/5 |
| 6,122,063 | A * | 9/2000 | Berndt et al. | 356/623 |

(Continued)

FOREIGN PATENT DOCUMENTS

| | | |
|---|---|---|
| EP | 0 359 084 | 3/1990 |
| EP | 1 262 814 | 12/2002 |

(Continued)

*Primary Examiner* — Tarifur Chowdhury
*Assistant Examiner* — Isiaka Akanbi
(74) *Attorney, Agent, or Firm* — Cozen O'Connor

(57) ABSTRACT

Determining position parameters defining relative position of a manufactured derivable surface relative to a reference surface, the process comprising: providing a nominal surface expressed in a nominal frame of reference and corresponding to the theoretical derivable surface to be manufactured with the nominal value of the position parameters defining the relative position of the nominal surface relative to the reference surface, providing a measured surface of the manufactured derivable surface expressed in the nominal frame of reference, providing at least one deformation surface defined by at least one deformation adjustable parameter, determining a composed surface by adding the measured surface and the deformation surface, determining the position parameters and at least one deformation parameter by minimizing the difference between the nominal surface and the composed surface.

14 Claims, 10 Drawing Sheets

(52) U.S. Cl.
CPC ......... *B24B 51/00* (2013.01); *B29D 11/00961* (2013.01); *G01B 21/00* (2013.01); *G02C 7/065* (2013.01); *G06Q 50/04* (2013.01)

(56) References Cited

U.S. PATENT DOCUMENTS

| | | | | |
|---|---|---|---|---|
| 7,201,631 | B2 * | 4/2007 | Thepot et al. | 451/5 |
| 2002/0018178 | A1 | 2/2002 | Shirayanagi et al. | |
| 2003/0107705 | A1 | 6/2003 | Zimmerman | |
| 2004/0085650 | A1 | 5/2004 | Fendt et al. | |
| 2010/0165330 | A1 | 7/2010 | Schneider et al. | |
| 2010/0245753 | A1 * | 9/2010 | Wolfgang et al. | 351/54 |

FOREIGN PATENT DOCUMENTS

| | | |
|---|---|---|
| EP | 1 950 601 | 7/2008 |
| EP | 2 199 845 | 6/2010 |
| WO | WO 2009/068613 | 6/2009 |

* cited by examiner

PROCESS FOR DETERMINING POSITION PARAMETERS OF A MANUFACTURED SURFACE RELATIVE TO A REFERENCE SURFACE

RELATED APPLICATIONS

This application is a U.S. National Phase Application under 35 USC 371 of International Application PCT/EP2012/058806 filed May 11, 2012.

This application claims the priority of European application No. 11305581.8 filed May 11, 2011, the entire content of which is hereby incorporated by reference.

FIELD OF THE INVENTION

The invention relates to a process implemented by computer means for determining position parameters defining the relative position of a manufactured derivable surface relative to a reference surface, to a manufacturing process and to a process for controlling such manufacturing process.

BACKGROUND OF THE INVENTION

Optical lenses, and in particular ophthalmic lenses, require very high quality manufacturing process in order to obtain high quality optical lenses.

Historically, optical lenses have been manufactured by different processes such as cast molding.

However, the molding method presents limitation in terms of cost.

Therefore, new manufacturing techniques such as digital surfacing are used.

Whereas to control the quality of the lenses produced using cast molding process, one can check the quality of the mold being used, such quality control is not possible when using the digital surfacing process. One could check each individual lens however such quality control would be very time consuming and present a limitation in terms of costs.

Therefore, quality control process has been developed that allow controlling the quality of the lenses produced using a digital surfacing process by controlling the quality of the manufacturing process itself. An example of such a process that allows checking efficiently the quality of the digital surfacing process is disclosed in EP 08 853 275.

The inventors have observed that the results provided by such process may not be entirely satisfactory. In particular, the inventors have observed that after such analyzing process the results may comprise certain artifacts.

SUMMARY OF THE INVENTION

One object of the invention is to improve such quality analyzing process in order to strengthen the control of the manufacturing process and the quality of manufactured lenses.

One object of the invention relates to a process implemented by computer means for determining position parameters defining the relative position of a manufactured derivable surface relative to a reference surface, the process comprising: a nominal surface providing step during which a nominal surface expressed in a nominal frame of reference and corresponding to the theoretical derivable surface to be manufactured with the nominal value of the position parameters defining the relative position of the nominal surface relative to the reference surface is provided, a measured surface providing step during which a measured surface of the manufactured derivable surface expressed in the nominal frame of reference is provided,—a deformation surface providing step during which at least one deformation surface defined by at least one deformation adjustable parameter is provided, a composed surface determining step during which a composed surface is determined by adding the measured surface and the deformation surface, a parameters determining step during which the position parameters and at least one deformation parameter are determined by minimizing the difference between the nominal surface and the composed surface.

Advantageously, a method according to an embodiment of the invention allows determining the position parameters defining the relative position of the manufactured derivable surface relative to the reference surface.

Indeed, the inventors have observed that the positioning parameters are first-order factors in the quality measurements of any digital surfacing process.

The position parameters that are determined using the process according to an embodiment of the invention comprise less artifact than when obtained using the method of the prior art. Furthermore, the process according to the invention allows determining at least one deformation parameter.

According to further embodiments which can be considered alone or in combination: the parameter determining step further comprises a zone determining step in which a zone of interest is determined in the nominal surface and the position and deformation parameters are determined by minimizing the difference between the nominal surface and the composed surface in the zone of interest; and/or the parameter determining step is implemented by using a damped least squares process; and/or the manufactured derivable surface is a surface of an ophthalmic lens; and/or the measured surface is determined by optical measurements; and/or the manufactured derivable surface is a non-symmetric derivable surface; and/or the position parameters comprise at least six parameters, for example three translation coefficients and three rotation coefficients; and/or the deformation surface corresponds to a spherotorus surface defined by a sphere parameter, a cylinder parameter and an axis parameter; and/or—the deformation surface corresponds to a right circular cone defined by an axis parameter and an angle parameter.

According to another aspect, the invention relates to a process for controlling a manufacturing process, comprising the steps of the above-described process and further comprising: an error surface determining step during which the error surface corresponding to the difference between the measured surface positioned relative to the reference surface by using the six position parameters and the nominal surface is determined, a controlling step during which the error surface is controlled.

Another aspect of the invention relates to a process for controlling a lens manufacturing process comprising the steps of:

a) manufacturing a master lens according to a manufacturing process using a manufacturing device, b) determining by the process according to the invention at least one deformation parameter of the master lens of step a), c) recording the value of the at least one deformation parameter, d) repeating regularly step a) to c) and checking the evolution of the at least one deformation parameter over time, wherein the evolution of at least one parameter of the manufacturing device used during the lens manufacturing process is checked over time and the evolution over time of at least one deformation parameter of the master lens is related with the evolution over time of the at least one parameter of the manufacturing device.

Another aspect of the invention relates to a manufacturing process for manufacturing a lens using a manufacturing device comprising the steps of:

providing a lens blank, blocking the lens blank, surfacing at least one surface of the lens blank, said manufacturing process being checked by a process according to the invention.

According to an embodiment, the process includes an ophthalmic progressive lens surfacing process, for example a digital surfacing process.

Another aspect of the invention relates to a computer program product for a data processing device, the computer program product comprising a set of instructions which, when loaded into the data processing device, causes the data processing device to perform at least one of the steps, for example all of the steps, of the method according to the invention.

Another aspect of the present invention provides a computer-readable medium carrying one or more set of instructions of a computer program product of the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In the sense of the invention "the manufacturing parameters" are the setting parameter of the different manufacturing devices involved in the manufacturing process. In the sense of the invention "the process parameter" includes any measurable parameters on the manufacturing devices used for the manufacturing of the lens.

BRIEF DESCRIPTION OF THE DRAWINGS

Non limiting embodiments of the invention will now be described with reference to the accompanying drawing wherein.

DETAILED DESCRIPTION OF THE DRAWINGS

Figure 1A:
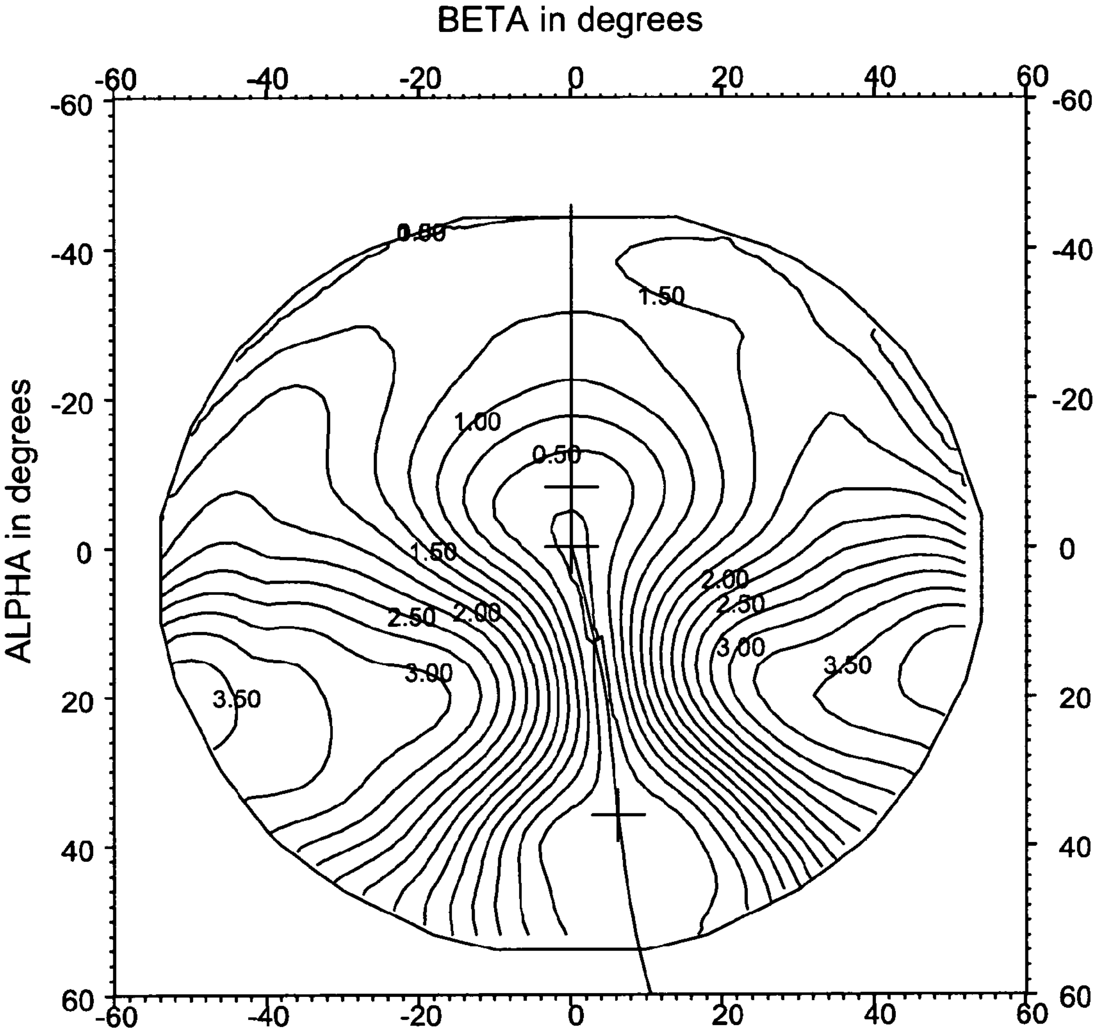
FIGS. 1*a* to 1*c* illustrate the influence of the positioning parameters of a surface of an ophthalmic lens on the distribution of astigmatism of said lens.
Figure 1B:
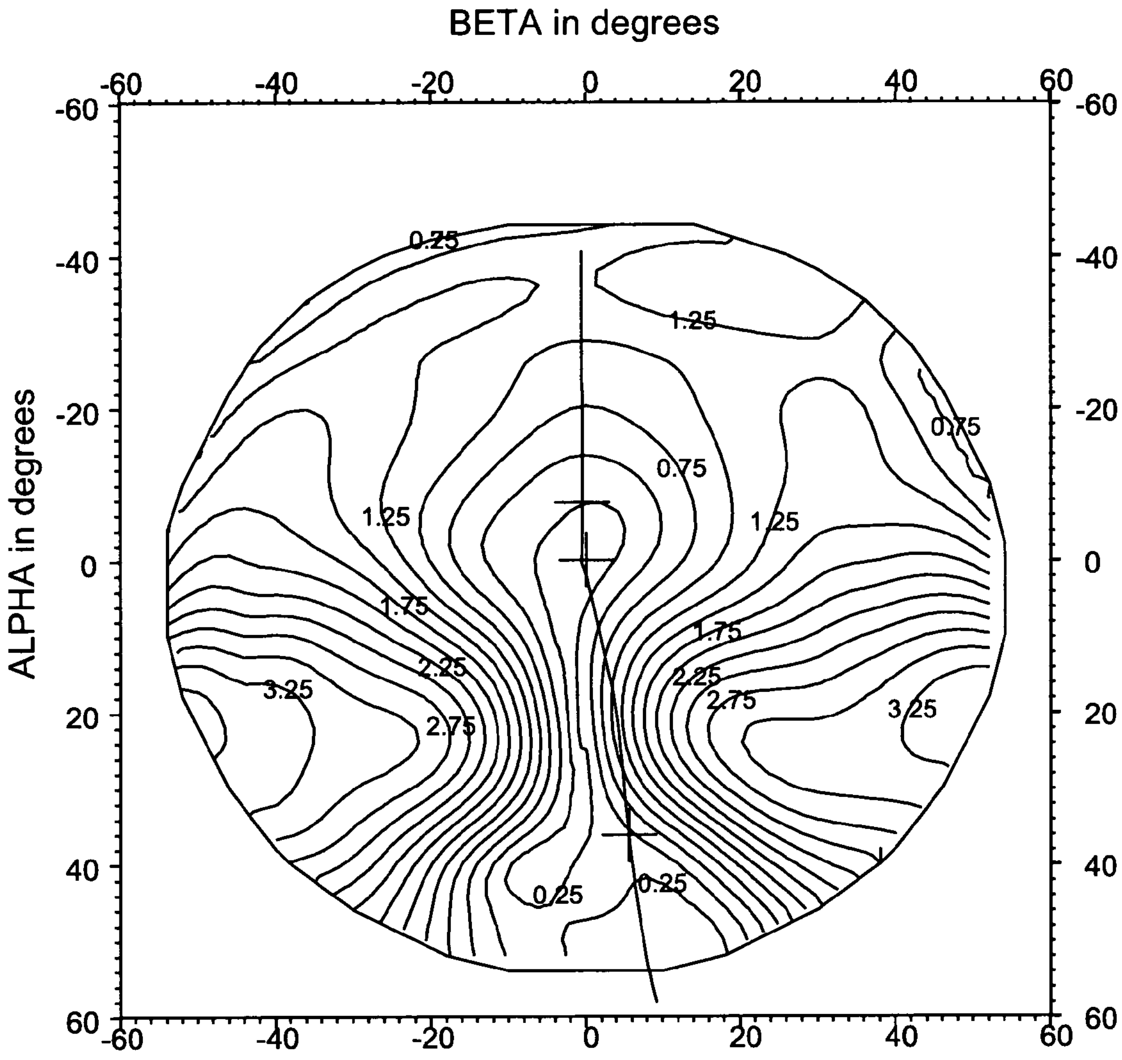
Figure 1C:
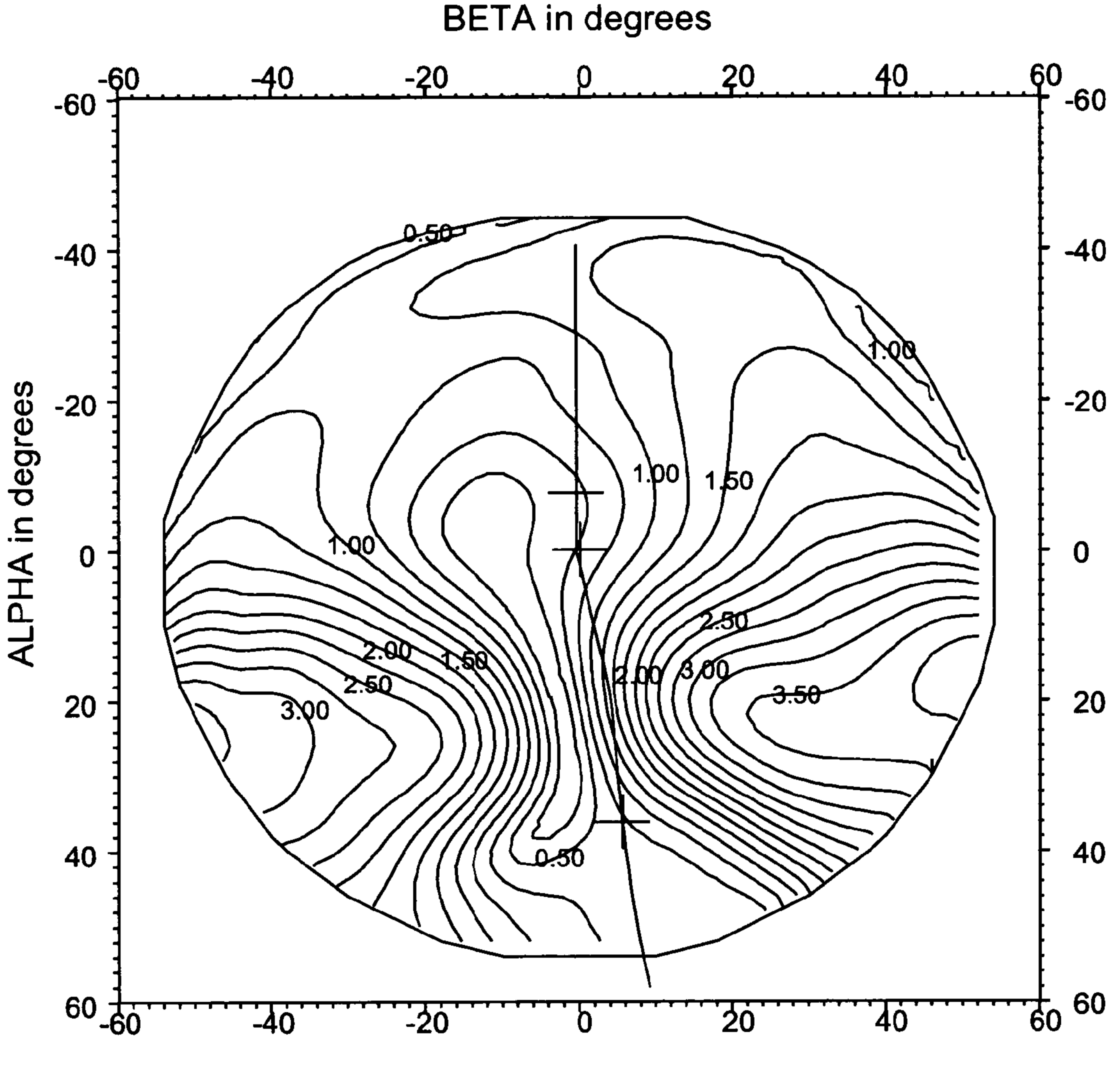

FIGS. 1*a* to 1*c* illustrate the effect of an error on the positioning parameters on the astigmatism of the resulting ophthalmic lens.

FIGS. 1*a* to 1*c* are two dimensional maps of a progressive addition lens of the type Varilux® Panamic™ with a front face of 2.12 dioptres and a rear face with a sphere of −7.75 a cylinder of 2.75 and addition of 2.75.

The two dimensional maps represent the distribution of astigmatism as perceived by the wearer.

FIG. 1*a* to 1*c* the front and back surfaces of the lens are the same the only differences lay in the position of the back surface.

In FIG. 1*a* the back surface is correctly positioned.

In FIG. 1*b*, the back surface is translated of 2 mm along the x-axis and the y-axis.

In FIG. 1*c*, the back surface is translated of 2 mm along the x-axis and the y-axis and rotated of 5° around the a-axis.

As it appears from FIGS. 1*a* to 1*c*, the difference in position of the back surface implies a great effect on the distribution of astigmatism as perceived by the wearer.

Thus, it is of great importance to be able to determine correctly the positioning parameters of the back surface. Besides, it is important not to mix up these changes of distribution of astigmatism (or power error) with changes caused by surface deformation. It is of great importance to be able to separate and distinguish the real causes of changes of distribution of wearer astigmatism (or more generally wearer power error), for both positioning errors and surface deformation errors.

FIGS. 2 and 3 provide examples of the influence of the deformation step of the process according to the invention.

In the example of FIGS. 2*a* to 2*d* a nominal progressive surface is compared to deformed progressive surface. The deformed progressive surface corresponds to the nominal progressive surface to which a spherical deformation of 0.1 dioptre was added.

When comparing the nominal and deformed surfaces, one should obtain a third surface correspond to a part of a sphere of 0.1 diopter.

FIGS. 2*a* to 2*d* illustrate the features of a third surface corresponding to the difference between the nominal surface and the deformed surface obtained using a prior art process. Such prior art process consist in determining the position parameter that minimize the difference between the deformed surface and the nominal surface.

The inventors have run the prior art process as if the deformed surface was a measured surface corresponding to a manufactured surface. The prior art process provides the position parameters of the deformed surface. By using such position parameters one can determine the features of corresponding ophthalmic lens. The features of the determined ophthalmic lens are represented on FIGS. 2*a* to 2*d*.

Figure 2A:
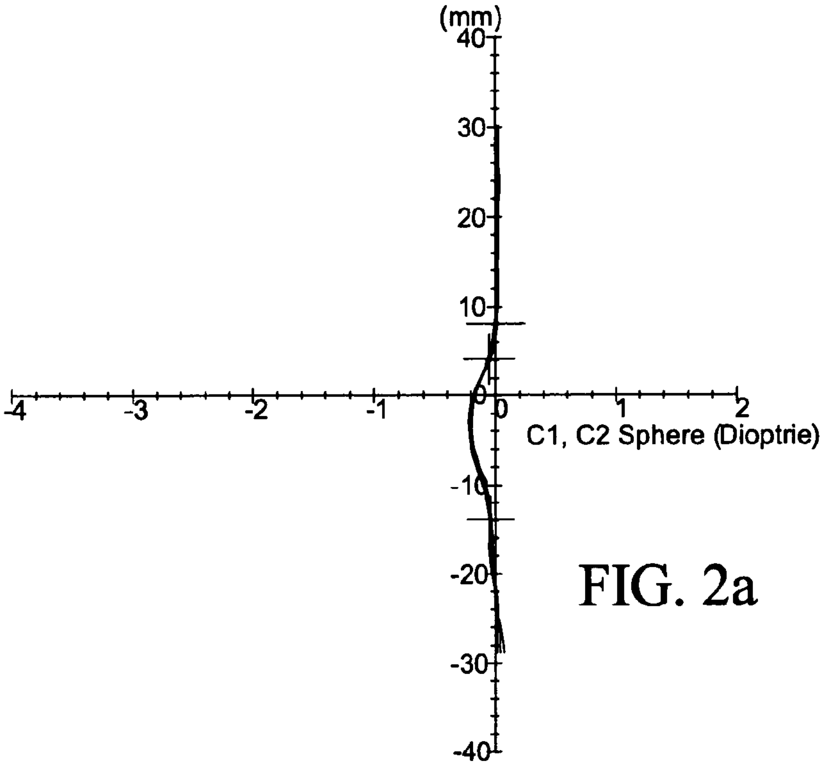
FIGS. 2*a* to 2*d* illustrate the results of a prior art process for determining the difference between a nominal surface and a measured surface.

FIG. 2*a* represents the power profile of the sags difference between the measured progressive lens and its nominal surface, obtained using the prior art process.

Figure 2B:
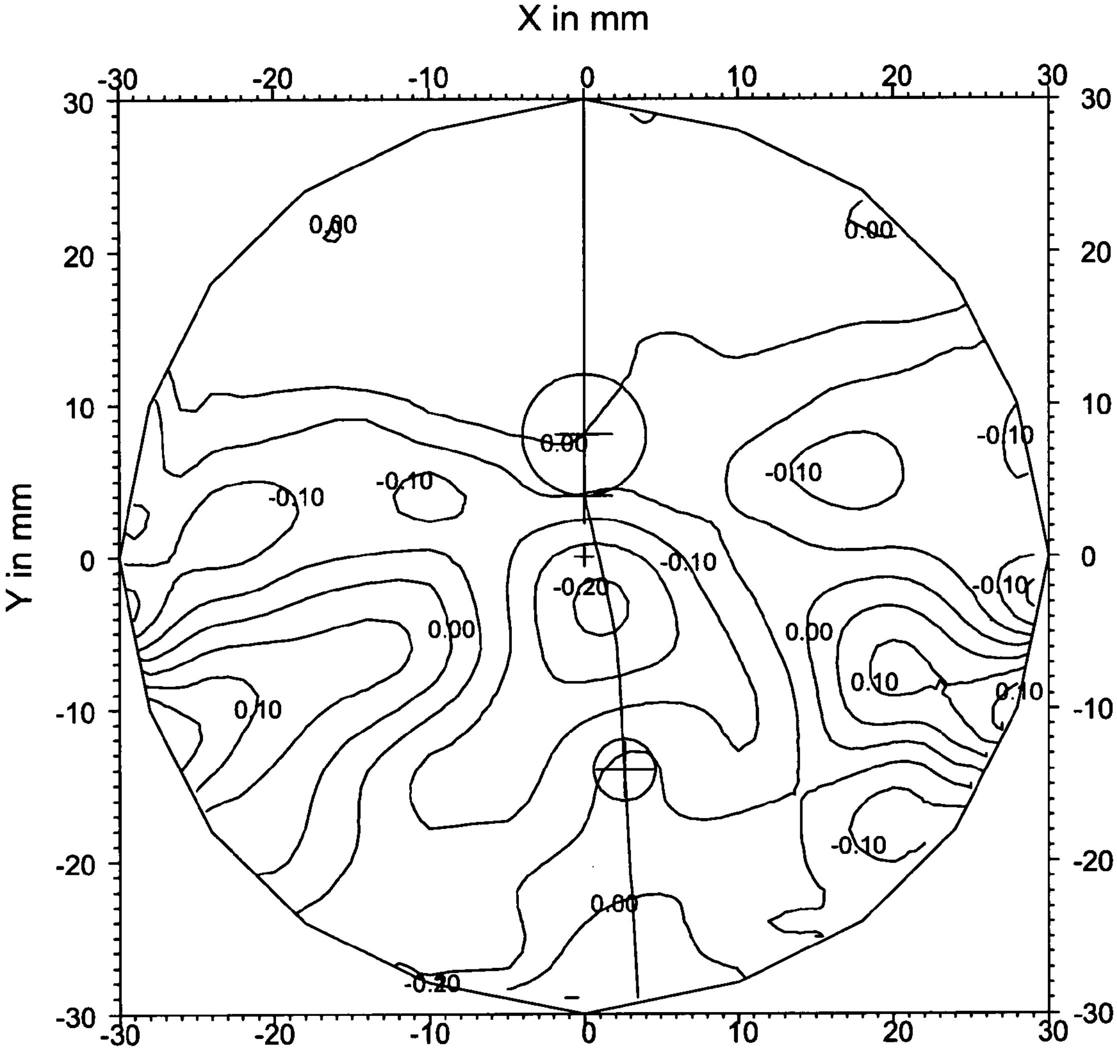

FIG. 2*b* represents the sphere distribution of this difference obtained using the prior art process.

Figure 2C:
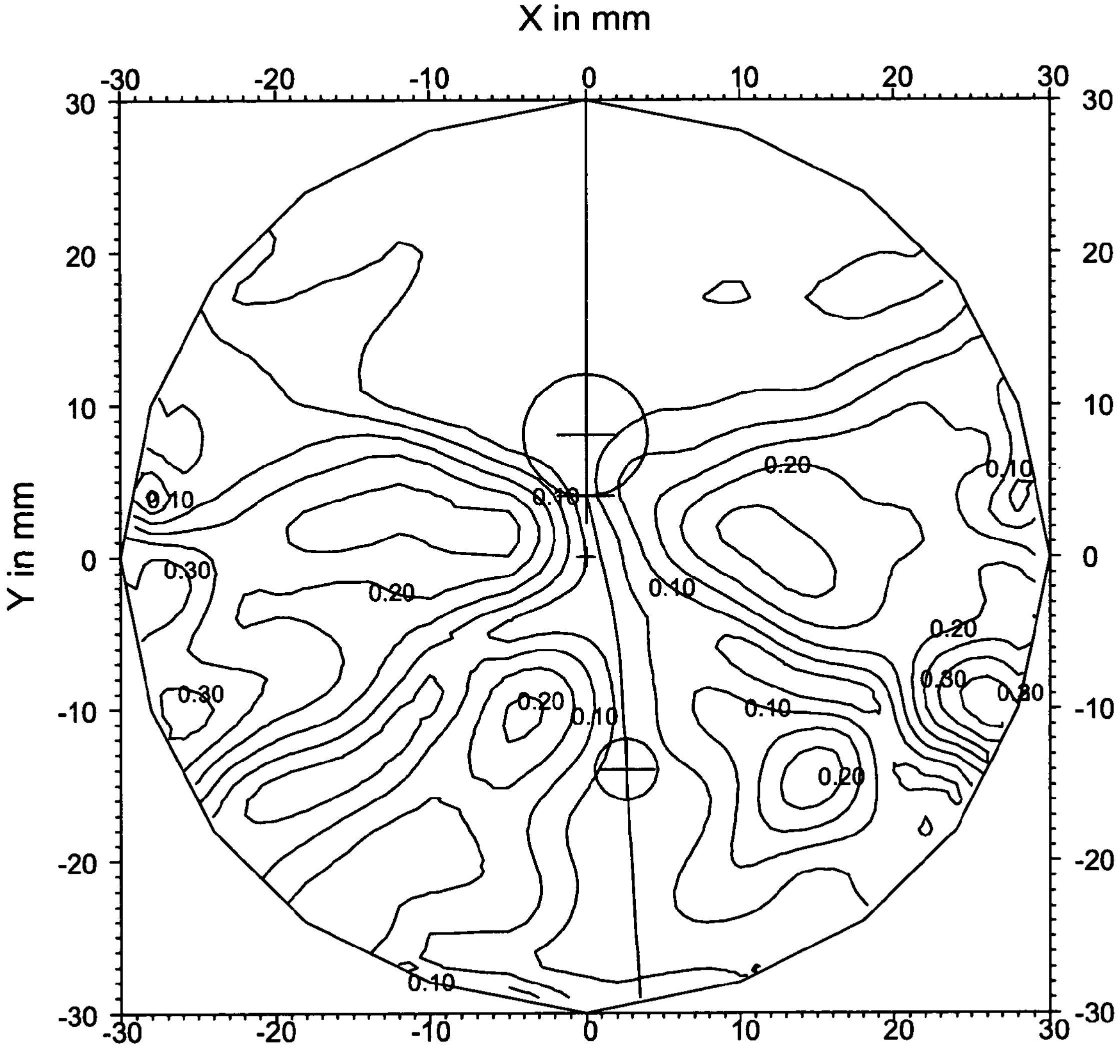

FIG. 2*c* represents the cylinder distribution of this difference obtained using the prior art process.

Figure 2D:
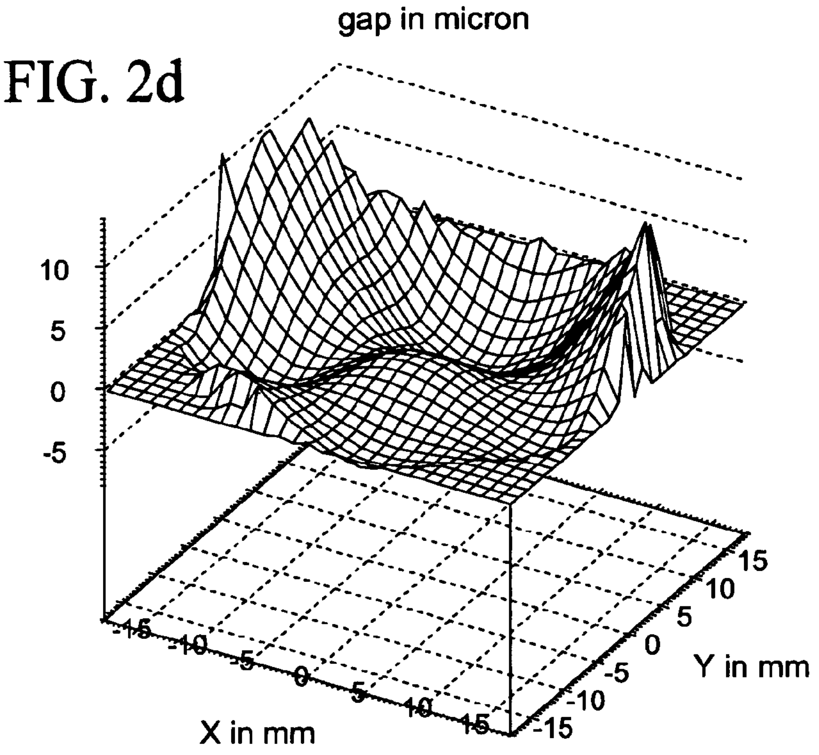

FIG. 2*d* represents the gap in microns between the measured progressive lens and its nominal surface, obtained using the prior art process.

Since the difference between the nominal surface and the progressive surface is a uniform deformation of 0.1 diopter, the power profile represented in FIG. 2*a* should be a straight line corresponding to 0.1 diopter and the sphere and cylinder distributions should be blank since the sphere should always be equal to 0.1 diopter and the cylinder should be equal to 0.

As illustrated by FIGS. 2*a* to 2*d*, the prior art process results in generating differences between the nominal surface and the deformed surface that actually do not exists.

In the example of FIGS. 3*a* to 3*d* a nominal progressive surface is compared to deformed progressive surface. The deformed progressive surface corresponds to the nominal progressive surface to which a progressive surface of 0.1 diopter of addition was added.

When comparing the nominal and deformed surfaces, one should obtain a third surface correspond to a progressive surface of 0.1 diopter of addition FIGS. 3*a* to 3*d* illustrate the features of a third surface corresponding to the difference between the nominal surface and the deformed surface obtained using a prior art process. Such prior art process consist in determining the position parameter that minimize the difference between the deformed surface and the nominal surface.

The inventors have run the prior art process as if the deformed surface was a measured surface corresponding to a manufactured surface. The prior art process provides the position parameters of the deformed surface. By using such position parameters one can determine the features of corresponding ophthalmic lens. The features of the determined ophthalmic lens are represented on FIGS. 3*a* to 3*d*.

Figure 3A:
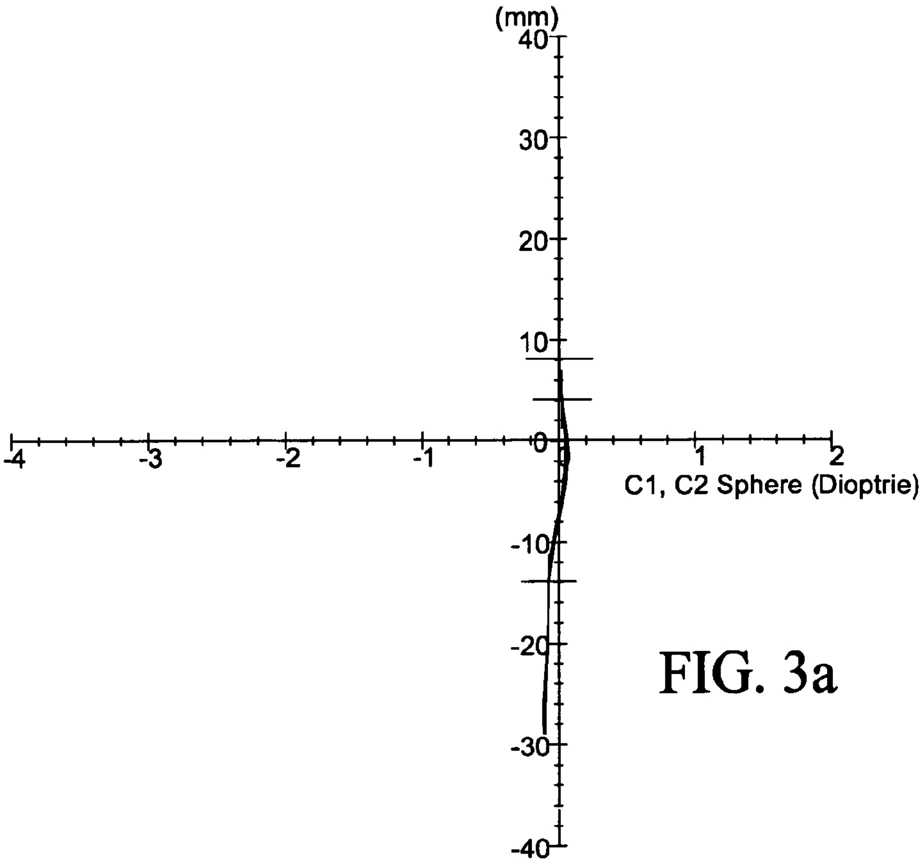
FIGS. 3*a* to 3*d* illustrate the results of a prior art process for determining the difference between a nominal surface and a measured surface.

FIG. 3*a* represents the power profile of the sags difference between of the measured surface of the progressive lens and its nominal surface, obtained using the prior art process.

Figure 3D:
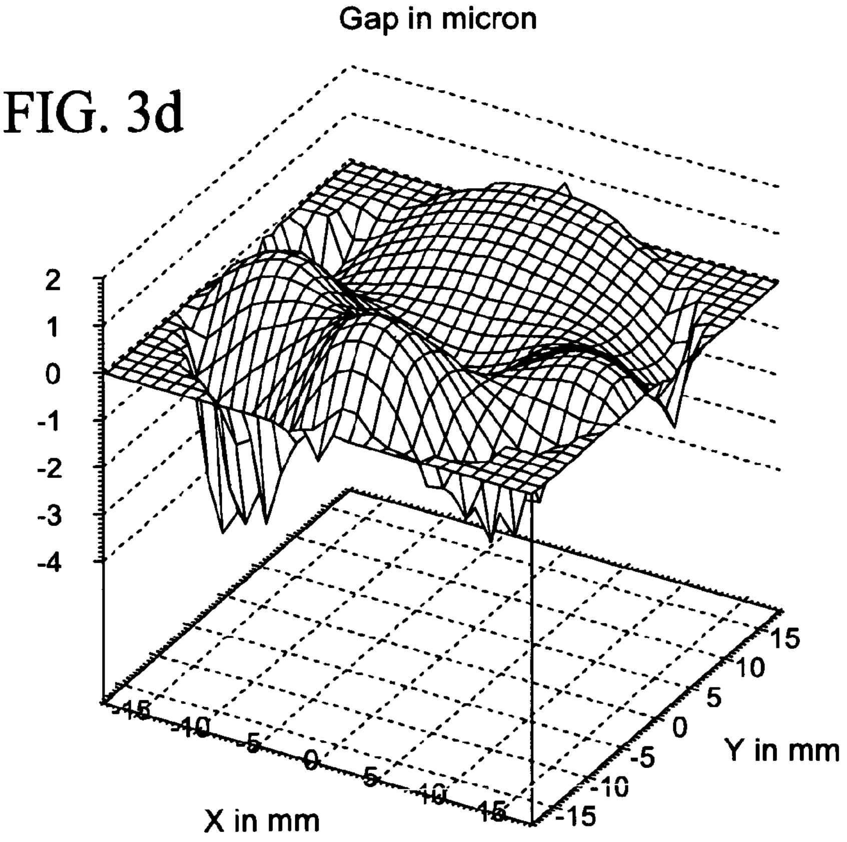
Figure 3B:
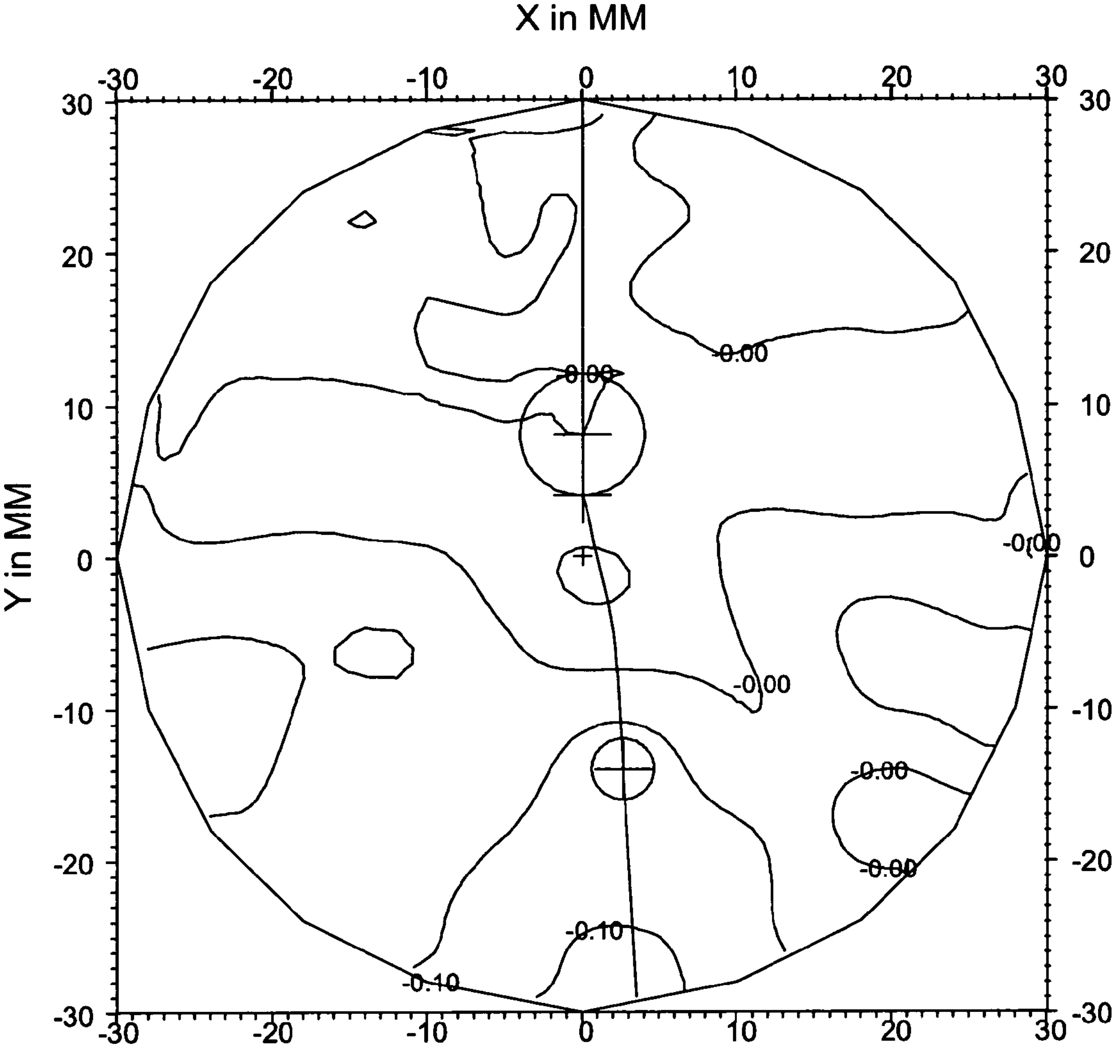

FIG. 3*b* represents the sphere distribution of this difference obtained using the prior art process.

Figure 3C:
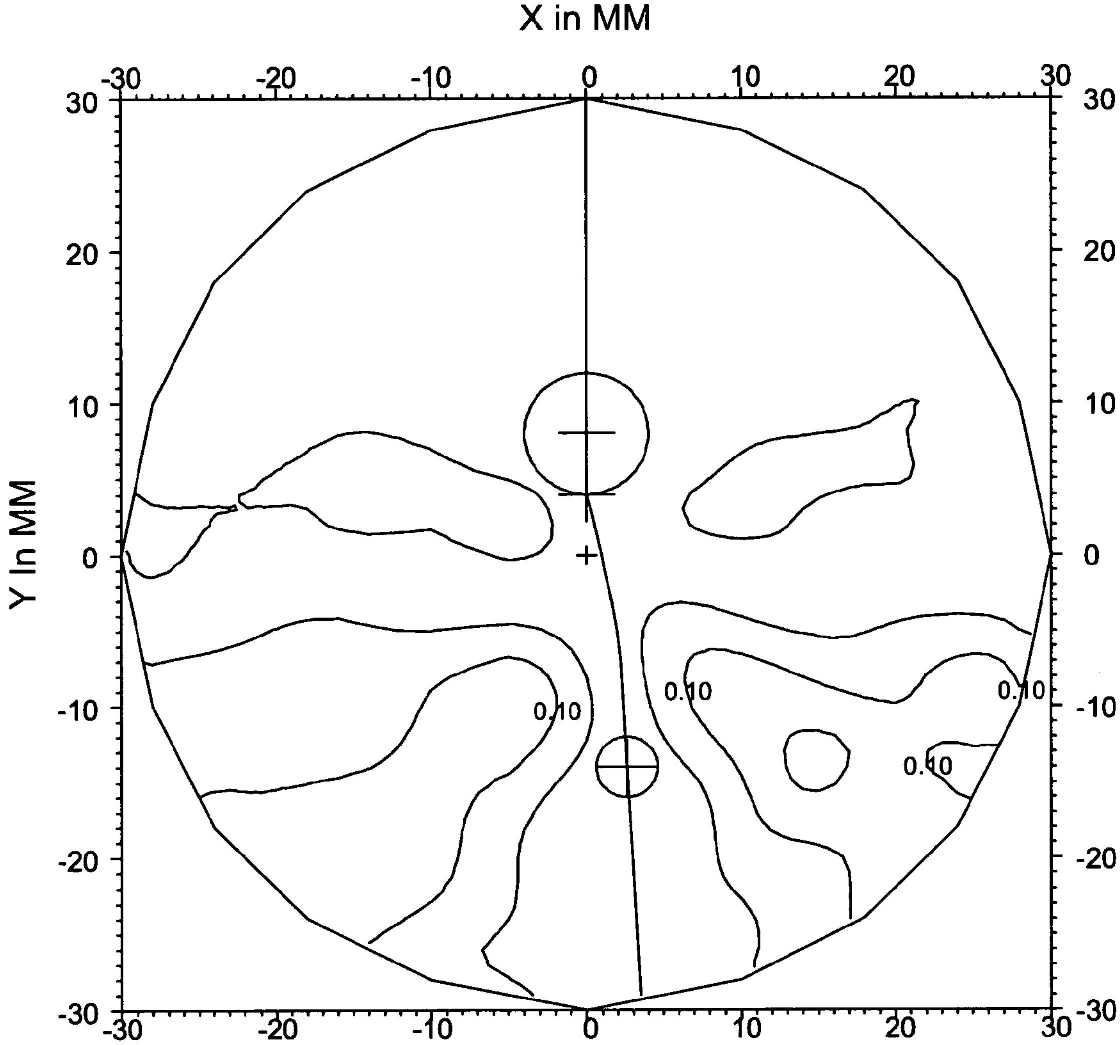

FIG. 3*c* represents the cylinder distribution of this difference obtained using the prior art process.

FIG. 3*d* represents the gap in microns between the measured progressive lens and its nominal surface, obtained using the prior art process.

The difference between the nominal surface and the deformation surface should be a progressive surface of 0.1 D of addition.

As illustrated by FIGS. 3*a* to 3*d*, the prior art process results in generating differences between the nominal surface and the deformed surface that actually do not exists.

From the above mentioned example that there is a need for a process to correctly position the measured surface with respect to the nominal surface and to determined deformation coefficient.

Figure 4:
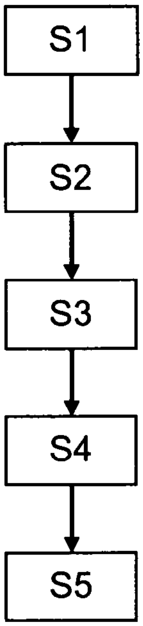
FIG. 4 is a flowchart of the steps comprised in a process for determining the positioning parameters according to an embodiment of the invention.

FIG. 4 illustrated the steps of a process according to the invention.

As illustrated on FIG. 4, a process according to the invention for determining position parameters defining the relative position of a manufactured derivable surface relative to a reference surface. Such process comprises:

a nominal surface providing step SI,
a measured surface providing step S2,
a deformation surface providing step S3,
a composed surface determining step S4, and
a parameter determining step S5.

According to the embodiments describe hereafter, the manufactured derivable surface is a surface of an optical lens. However, the invention is not limited to such type of surface. In particular, the manufactured surface may be a non-symmetric derivable surface.

During the nominal surface providing step SI, a nominal surface expressed in a nominal frame of reference and corresponding to the theoretical derivable surface to be manufactured with the nominal value of the position parameters defining the relative position of the nominal surface relative to the reference surface is provided.

The positioning parameters may comprise at least six parameters, for example three translation coefficients along the axis of the nominal frame and three rotation coefficients around the axis of the nominal frame.

In the measured surface providing step S2, a measured surface of the manufactured derivable surface expressed in the nominal frame of reference is provided.

For example, after the manufactured derivable surface is manufactured, it is measured using optical measurements and said measured surface is expressed in the same nominal frame of reference as the nominal surface provided in the nominal surface providing step SI.

The process according to the invention comprise a deformation surface providing step S3 during which at least one deformation surface defined by at least one deformation parameter is provided.

According to an embodiment of the invention, one of the deformation surface may be a sphero-torus surface defined by a sphere parameter, a cylinder parameter and an axis parameter.

According to an embodiment of the invention, one of the deformation surface may correspond to a right circular cone defined by an axis parameter and an angle parameter.

The deformation surface providing step of the process according to the invention may comprise providing a plurality of deformation surfaces.

Indeed, the inventors have observed that it is possible to link the coefficient defining the deformation surface and some manufacturing parameters of the manufacturing process. Therefore, it may be interesting to provide as many deformation surfaces as possible in order to be able to control as many manufacturing parameters as possible.

According to the process of the invention, after having provided the deformation surfaces, the process further comprises a composed surface step S4 during which a composed surface is determined by adding the measured surface and all the different deformation surfaces.

During the parameters determining step S5, the position parameters defining the position of the measured surface relative to the reference surface in the nominal frame of reference and the deformation parameters defining the different deformation of the different deformation surfaces are determined.

According to an embodiment of the invention, the parameters are determined during the parameters determining step S5 by minimizing the difference between the nominal surface and the composed surface.

According to an embodiment of the invention, the parameters determining step S5 further comprises a zone determining step in which a zone of interest is determined in the nominal surface and the position and deformation parameters are determined by minimizing as much as possible the difference between the nominal surface and the composed surface in the zone of interest.

According to an embodiment of the invention, the parameters determining step S5 is implemented by using a damped least squares process.

The invention also relates to a method for controlling a manufacturing process for example a lens manufacturing process.

Figure 5:
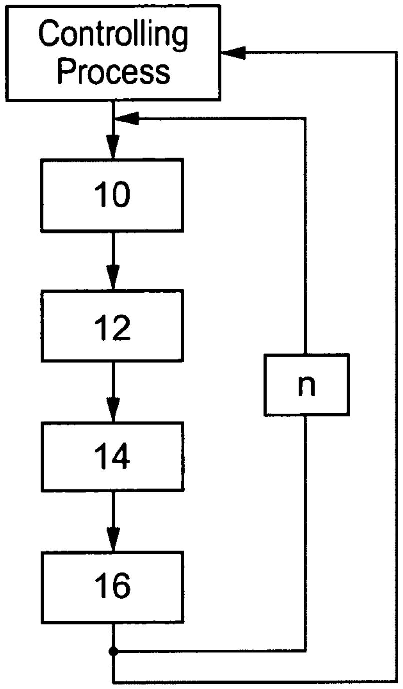
FIG. 5 is a flowchart of the steps comprised in a manufacturing process according to an embodiment of the invention.

As illustrated in FIG. 5, a lens manufacturing process using a manufacturing device comprises the steps of providing 10 a lens blank, blocking 12 the lens blank using a blocking device, machining 14 one surface of the lens blank using a machining device, for example a generator or 3D coarse grinding machining device and polishing 16 the machined surface of the lens using a polisher.

The manufacturing steps 10 to 16 are repeated n times. After n repetitions of the manufacturing steps a controlling process according to the invention is processed.

The manufacturing process according the invention can be used to manufacture any type of lens, for example ophthalmic lens such as for example progressive additional lens.

The lens blank provided during the providing step 10 can be a semi-finished lens blank.

The blocking step can be processed using any blocking devices known from the man skilled in the art; such a device is disclosed for example in patent documents U.S. Pat. No. 4,229,911 or 2006/031687.

The manufacturing step 14 consists in generating a desired design on the unfinished surface of the lens. Generators are common devices known from the man skilled in the art; such a device is disclosed for example in patent documents EP 0 849 038 or US 2005/0188516.

The polishing step 16 consists in smoothing the manufactured surface. Polishing devices are well known in the art.

Once the manufacturing parameters have been properly calibrated using for example a qualification process as disclosed in EP 08 853 275, lenses can be manufactured using the manufacturing process according to the invention.

Figure 6:
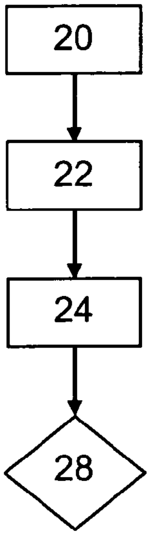
FIG. 6 is a flowchart of the steps comprised in a controlling process according to an embodiment of the invention.

Such a manufacturing process can be controlled by a controlling process according to the invention as illustrated on FIG. 6, and comprising the steps of:

a) manufacturing a master lens 20 according to a manufacturing process using a manufacturing device, b) determining by the process according to the invention at least one deformation parameter of the mater lens 22 of step a), c) recording the value of said deformation parameter 24, d) repeating regularly step a) to c) and checking 28 the evolution of said deformation parameter over time.

According to an embodiment of the invention, the master lenses can be manufactured several times per day or be manufactured on a regular basis not every day.

According to an embodiment of the invention the master lens has a different geometrical and/or optical parameter and/or is made of a different material than the lenses to be manufactured during the manufacturing process.

The choice of the master lens can be done so as to amplify the sensibility of certain parameter to the process parameters. For example, the master lens is made of a material and has a design such as its optical parameters are more sensitive to a modification of the process parameter that the usual manufactured lenses.

Examples of master lens design are given in EP 08 853 275.

The inventors have observed a correlation between the deformation parameters that can be determined using the method according to the invention and the manufacturing parameters.

For example, the inventors have observed a correlation between the sphere, cylinder and axis parameters of the sphero-torus deformation surface and the way the optical lens is blocked during the manufacturing device.

Therefore, by determining the sphere, cylinder and axis parameters using the process according to the invention on master lens manufactured regularly, it is possible to detect a defect in the blocking step.

The inventors have also observed that when the deformation surface corresponds to a right circular cone defined by an axis parameter and an angle parameter, said parameters can be correlated to the positioning of the grinding tool during the manufacturing process.

Therefore, the process according to the invention allows not only to detect a defect in the manufacturing process but also thanks to the determination of the deformation parameters to identifies where in the manufacturing process a defect is starting to appear.

The previous examples of deformation parameters are included to illustrate embodiment of the invention. It should be appreciated by those of skill in the art that the techniques disclosed in these examples represent techniques observed by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention defined by the following claims.

The invention claimed is:

1. A process implemented by computer means for determining at least six position parameters defining the relative position of a manufactured derivable surface relative to a reference surface, wherein the manufactured derivable surface is a surface to be manufactured of an ophthalmic lens, and for determining at least one deformation parameter of a deformation surface of the ophthalmic lens, the process comprising:

a nominal surface providing step during which a nominal surface expressed in a nominal frame of reference and corresponding to the theoretical derivable surface to be manufactured with the nominal value of the position parameters defining the relative position of the nominal surface relative to the reference surface is provided;

a measured surface providing step during which a measured surface of the manufactured derivable surface expressed in the nominal frame of reference is provided;

a deformation surface providing step during which at least one deformation surface defined by at least one deformation adjustable parameter is provided;

a composed surface determining step during which a composed surface is determined by adding the measured surface and the deformation surface;

a parameters determining step during which the position parameters and the at least one deformation parameter are determined by minimizing the difference between the nominal surface and the composed surface, an error surface determining step during which the error surface corresponding to the difference between the measured surface positioned relative to the reference surface by using the at least six position parameters and the nominal surface is determined; and a controlling step during which the error surface is controlled.

2. The process according to claim 1, wherein the parameter determining step further comprises a zone determining step in which a zone of interest is determined in the nominal surface and the position and deformation parameters are determined by minimizing the difference between the nominal surface and the composed surface in the zone of interest.

3. The process according to claim 1, wherein the parameter determining step is implemented by using a damped least squares process.

4. The process according to claim 1, wherein the manufactured derivable surface is a surface of an ophthalmic progressive lens.

5. The process according to claim 1, wherein the measured surface is determined by optical measurements.

6. The process according to claim 1, wherein the manufactured derivable surface is a non-symmetric derivable surface.

7. The process according to claim 1, wherein the at least six position parameters comprise three translation coefficients and three rotation coefficients.

8. The process according to claim 1, wherein the deformation surface corresponds to a sphero-torus surface defined by a sphere parameter, a cylinder parameter and an axis parameter.

9. The process according to claim 1, wherein the deformation surface corresponds to a right circular cone defined by an axis parameter and an angle parameter.

10. A process for controlling an ophthalmic lens manufacturing process comprising the steps of:

a) manufacturing a master ophthalmic lens according to a manufacturing process using a manufacturing device;

b) determining by the process according to claim 1 at least one deformation parameter of the master lens of step a);

c) recording the value of the at least one deformation parameter; and d) repeating regularly steps a) to c) and checking the evolution of the at least one deformation parameter over time, wherein the evolution of at least one parameter of the manufacturing device used during the ophthalmic lens manufacturing process is checked over time and the evolution over time of at least one deformation parameter of the master ophthalmic lens is related with the evolution over time of the at least one parameter of the manufacturing device.

11. A manufacturing process for manufacturing a lens using an ophthalmic manufacturing device comprising the steps of:

providing an ophthalmic lens blank;

blocking the ophthalmic lens blank; and surfacing at least one surface of the ophthalmic lens blank, wherein the manufacturing process is checked by a process according to claim 1.

12. A non-transitory computer program product for a data-processing device, the computer program product comprising a set of instructions which, when loaded into the data-processing device, causes the device to perform the steps of the process according to claim 1.

13. A non-transitory computer-readable medium carrying one or more sequences of instructions of the computer program product of claim 12.

14. The process according to claim 11, wherein the ophthalmic lens is an ophthalmic progressive lens and wherein surfacing at least one surface of the ophthalmic lens blank comprises digital surfacing.

* * * * *